(12) United States Patent
Rönneke (10) Patent No.: US 7,457,253 B2
(45) Date of Patent: Nov. 25, 2008

(54) SYSTEM, AN ARRANGEMENT AND A METHOD RELATING TO IP-ADDRESSING

(75) Inventor: Hans Rönneke, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 768 days.

(21) Appl. No.: 10/947,550

(22) Filed: Sep. 23, 2004

(65) Prior Publication Data

US 2005/0117590 A1 Jun. 2, 2005

Related U.S. Application Data

(63) Continuation of application No. PCT/SE03/00487, filed on Mar. 25, 2003.

(30) Foreign Application Priority Data

Mar. 26, 2002 (SE) .................................. 0200939

(51) Int. Cl.
*H04L 12/28* (2006.01)

(52) U.S. Cl. ...................... 370/254; 370/338
(58) Field of Classification Search ............... None
See application file for complete search history.

(56) References Cited

U.S. PATENT DOCUMENTS 5,995,503 A * 11/1999 Crawley et al. ............. 370/351

FOREIGN PATENT DOCUMENTS

| WO | WO 01/54437 | 7/2001 |
| WO | WO 01/67798 | 9/2001 |

OTHER PUBLICATIONS

Johnson & Perkins, "Mobility Support in IPv6" (Jul. 2, 2001); retrieved from Internet on Sep. 25, 2002: http://www.mipl.mediapoli.com/drafts/draft-ietf-mobileip-ipv6-15.txt.
Narten et al., Neighbor Discovery for IP Version 6 (IPv6), RFC2461 (Dec. 1998), retrieved from Internet on Sep. 25, 2002: http://www.gaqs.org/rfcs/rfc2461.html—See Chp. 6.2.4.

* cited by examiner

*Primary Examiner*—Chau Nguyen
*Assistant Examiner*—Dargaye H Churnet
(74) *Attorney, Agent, or Firm*—Nixon & Vanderhye P.C.

(57) ABSTRACT

The present invention relates to a communication system comprising a number of end user stations (hosts) connected over access networks and routing arrangements. The system supports a IPv6 (Internet Protocol version 6) addressing scheme, wherein the end user stations are connected to the routing arrangements over links, and sending of router advertisements from router arrangements to end user stations (hosts) being implemented to support provisioning of IPv6 addresses for the end user station. Router advertisements (RAs) from a routing arrangement to an end user station are sent with a controllable and variable frequency during an initial phase. During said initial phase, the frequency is higher at the beginning and lower at the end.

31 Claims, 9 Drawing Sheets

STATE OF THE ART

SYSTEM, AN ARRANGEMENT AND A METHOD RELATING TO IP-ADDRESSING

This application is a Continuation of international application PCT/SE03/00487 filed in English on 25 Mar. 2003, which designated the US. PCT/SE03/00487 claims priority to Swedish Application No. 0200939-7 filed 26 Mar. 2002. The entire contents of these applications are incorporated herein by reference.

FIELD OF THE INVENTION

The present invention relates to end user station addressing in a communication system. Particularly it relates to a communication system comprising a number of routing arrangements and a number of end user stations connecting to such routing arrangements over links. The system particularly supports an IPv6 addressing scheme and implements sending of router advertisements from router arrangements to end user stations for supporting (end user station) creation or generation of IPv6 addresses.

The invention also relates to a routing arrangement as referred to above, and to a method of, in an IP communication system supporting an IPv6 addressing scheme, providing an end user station with information about the first part of the IPv6 address, such that the end user is able to create/generate the remainder of the address. Particularly the invention relates to implementation of IPv6 addressing in a wireless domain, IP networks in general, or within the 3GPP ($3^{rd}$ Group Partnership Project) in general, or in a WLAN (Wireless Local Area Network) environment.

BACKGROUND

Already today there is an enormous amount of end user stations, or network terminals, used for many different purposes. In the future there will be even more and more network terminals also for other, future, purposes. Examples on end users stations are mobile phones, PDAs (Personal Digital Assistants), computers, Laptops, Palm tops, cable-TV modems, X-DSL modems, intelligent networked appliances, wireless web pads etc. In other words, enormous amounts of network devices are expected in the near future. However, all these network terminals or end user stations need to be addressable. In general each network terminal or end user station must have its own unique, public IP-address. This is particularly important in order to be able to realize the vision of "always on", "always connected", and "always reachable" from anywhere. In the future there will also be more and more different networks which all are connected with each other, such as company networks, broadband access networks, residential networks, cellular networks, wireless networks, local networks etc.

Until now the Internet has been based on the IP-protocol version 4, IPv4, addressing scheme. The IP-protocol version 4 uses a 32-bit address in the form of [IP-address-XXX.XXX.XXX.XXX/subnet mask-XXX.XXX.XXX.XXX]. However, the available address space of IPv4 will soon have come to an end and there will not be enough unique IP-addresses left to handle out for a new operator or for new types of end user stations or for more devices in general. Even if technologies such as private IP-address networks in combination with NAT (Network Address Translation) and different types of proxies are used, this would not be enough.

Therefore the new addressing scheme, IP version 6, has been suggested. IPv6 uses a 128-bit address base. This means that the address length is four times that of IPv4. The IPv6 basic specification includes in addition thereto security and it includes packet encryption, ESP (Encapsulated Security Payload) and source of authentication, AH (Authentication Header).

Other advantages of IPv6 is that, in order to support for real time traffic such as video conferences, IPv6 has a "flow label". Using flow labeling, it gets possible for a router to know which end-to-end flow a packet belongs to, and then to find out which packets belong to the real time traffic class. Moreover the basic specification of IPv6 includes an address auto-configuration facility. This means that even a novice user can connect his machine, or the end user station, to the network. It may also implement a specification optimisation in that it discards old and useless parts of IPv4 whereas it keeps with useful parts of IPv4. Moreover it includes support for mobile Internet.

Work is in progress within 3GPP standardisation Release 5, to introduce IPv6 in the 3GPP standards. IPv6 as specified within IETF (Internet Engineering Task Force) standard body does in general not take any special consideration to the specific environment in the cellular/wireless domain, e.g. as far as the radio resources are concerned, and as far as power consumption of the terminal is concerned. The known solution of IPv6 address autoconfiguration is described in IETF RFC (Request For Comments) 2461, which herewith is incorporated herein by reference. In this document the algorithm for sending first initial Router Advertisements (RA) from a router to an end user station is described. Generally the constants controlling the sending of RA are set so that three initial RAs are sent with 16 seconds interval.

After the initial phase, a router (e.g. GGSN), (Gateway GPRS Support Node,) shall start to send RAs periodically, default one RA approximately every 10 minutes. It should be noted that the IETF standard, e.g. the RFC 2461, leaves it open to specify specific values on their specified constants for specific "links". The connection between a mobile terminal and the GGSN is one specific link. It should also be noted that the mobile terminal needs the RA to be able to create its IPv6 address. The RA contains the "Prefix" which is the first part (64 bits) of the 128 bit IPv6 address. The mobile terminal takes this prefix, adds a 64 bit suffix (which in the 3GPP case could be a random number), and then it has its global (or site-local) IPv6 address and can start to communicate. The problem is that the RAs are not sent frequently enough during the initial phase resulting in a slow set up of the GPRS of 3G packet/IP connection to Internet or Intranet. End users do not want to wait for for example 15 seconds before they can start to use the page they have requested on their mobile phone, or start the video/multimedia-phone-call after they have dialled the number. The general wish is to be able to push the button and then expect a response within one or a few seconds. The problem with just setting the RFC 2461 specified parameters to a value allowing these frequent RAs (e.g. at intervals of 1,2 or 3 seconds, is that during the first minute, far to may RAs will have to be sent over the radio interface, perhaps 30 or more. That will consume radio resources and also processing resources in 3G nodes, like GGSN, SGSN, RNC and Node B, not for one but for every PDP context that is initiated (cf. 3GPP TS 23.060; "General Packet Radio Service (GPRS); Service Description of Stage 2, which herewith is incorporated herein by reference). Setting the parameters so that fewer RAs will be sent, will on the other hand result in a long response time for the end user.

SUMMARY

It is therefore an object to suggest a solution which enables a fast creation or generation of an IPv6 address for an end user station, fixed or wireless, to enable a fast set up. It is a particular object to suggest a solution through which the specific requirements and problems, of a wireless environment can be considered as far as IPv6 addressing schemes are concerned. Even more particularly it is an object to suggest a solution through which radio resources can be saved, i.e. through which waste of radio resources is eliminated or reduced, and through which the power consumption of wireless/mobile end user stations is considered, and not wasted, as far as IPv6 addressing is concerned.

It is also an object to suggest a solution, a system, a routing arrangement and a method respectively, which enables a fast set up of an IP connection, e.g. a GPRS/UMTS/WCDMA or 3GPP connection in particular, to e.g. Internet and/or an intranet, or for a WLAN (Wireless Local Area Network).

Further yet it is an object to provide a solution through which unnecessary transmissions of router advertisements are avoided, particularly to enable an optimisation as far as giving information to wireless end user stations about IPv6 addressing information is concerned to enable generation of a full IPv6 address at the end user station. Particularly it is an object of the invention to offer to the end user an acceptable response time when e.g. using a wireless station, such as a 3GPP mobile station.

Still further it is an object to provide a solution through which a fast response to IPv6 address autoconfiguration is allowed while sill saving radio resources in radio networks, particularly within the 3GPP domain, or even more particularly within the 3GPP IP Multimedia Subsystem (IMS) domain, and while still saving processing power in network nodes, e.g. routing arrangements, such as GGSNs.

A communication system is suggested, which comprises a number of end user stations (hosts) connected over access networks and routing arrangements, which system supports a IPv6 (Internet Protocol version 6) addressing scheme. The end user stations are connected to the routing arrangements over links, and the system supports sending of router advertisements from router arrangements to end user stations (hosts) being implemented to support provisioning of IPv6 addresses for the end user station. Router advertisements (RAs) are sent from a routing arrangement to an end user station with a controllable and variable frequency during an initial phase. During said initial phase, the frequency is higher at the beginning and lower at the end.

Particularly the links are point-to-point links, but the concept can also be used for other links. Advantageously the frequency with which router advertisements are sent gradually decreases, i.e. the lengths of the time intervals between consecutive router advertisements gradually increase. In particular implementation the lengths of the time intervals between router advertisements increase exponentially. The decrease in frequency for sending of router advertisements may, in one implementation, occur at given transmissions, e.g. at every second transmission of a router advertisement etc. and in that the decrements in frequency may vary, e.g. from smaller to larger.

Advantageously router advertisements are sent during the initial phase, with a varying, decreasing, frequency during a given time. Preferably router advertisements are sent during the initial phase, with a varying, regularly or irregularly, decreasing frequency, at least during a given time period and the time intervals are configurable, e.g. separately, by the routing arrangement.

In a particular implementation initial router advertisements (RAs) during the initial phase are sent with consecutive time intervals ($\Delta T_i$) varying as ($\Delta T_{i, i=1, \ldots}$) 1 s, 2 s, 4 s, 8 s, 16 s, 32 s, starting with the time interval for sending a first router advertisement, e.g. after establishment of connection. Initial router advertisements (RAs) may be sent for at least 30 seconds. The time periods to lapse before sending a first RA and subsequently between consecutive router advertisements may be hard coded or configurable. After the initial phase has lapsed, the periodicity for sending of router advertisements is fixed or constant, or e.g. given by a maximum or minimum value.

In particular implementations sending of a message to request information needed for creation of an IPv6 address from the end user station to the routing arrangement is implemented, e.g. a router solicitation (RS). Upon reception of such a message, the router arrangement only sends one response router advertisement during the initial phase (unless requested through a RS again). This is specially applicable on point-to-point links, since then there is only one host on each link. A first initial router advertisement may sent from the routing arrangement to an accessing/requesting end user station substantially immediately upon access/request, i.e. when the router arrangement becomes aware of the fact that the end user station needs a router advertisement. Then the randomised part of the calculation as the time o transmission is omitted. This generally presupposes that there is only one host on the link, although it also could be applicable in other cases.

Particularly the system implements IPv6 address autoconfiguration. Further the system comprises an IP network, with fixed and/or wireless end user stations (hosts), e.g. a 3GPP system, e.g. WCDMA, GSM/GPRS, UMTS. It may also comprise a Wireless Local Area Network (WLAN). Then, however, the links are generally not point-to-point links. For the 3GGP domain the routing arrangements comprise GGSNs, i.e. GGSNs perform the routing functionality in this aspect and at least some end user stations are mobile hosts, the prefix of the IPv6 address being provided to the mobile host by the Router Advertisement (RA), and upon reception thereof the mobile host creates/generates the IPv6 suffix, e.g. a random number.

In one implementation a maximum or a default value is given, indicating the total number of router advertisements or the total time period of the initial phase when a link has been established between the mobile host (station) and the GGSN. Implementation of sending of Router Solicitations (RSs) from the mobile station to the GGSN for requesting a Router Advertisement may be implemented, alternatively it is not. After transmission of a Router Advertisement to the end user station, the further transmission of Router Advertisements during the initial phase may be interrupted of the RA can be seen as a response to an RS, particularly for point-to-point links. According to the invention it is also provided a routing arrangement, in an IP communication system supporting an IPv6 addressing scheme, and connecting to a number of end user stations over links. The routing arrangement implements sending of router advertisements to provide an end user station with information about the first part (prefix) of the IPv6 address. Router advertisements to an end user station are sent with a controllable and varying frequency during an initial phase, and during said initial phase, the frequency is higher at the beginning and lower at the end. The frequency with which router advertisements are sent gradually decreases, i.e. the lengths of the time intervals before sending a first router advertisement and between consecutive router advertisements gradually increase, particularly exponentially. Router Advertisements may be sent during the initial phase, with a varying, regularly or irregularly decreasing frequency, at least during a given time period.

In advantageous implementations sending of messages to request information needed for creation of an IPv6 address from the end user stations to the routing arrangements is implemented, e.g. a router solicitation (RS). Upon reception of such a message, the router arrangement only sends one response router advertisement during the initial phase, unless a further router solicitation is received, indicating that the user station did not actually receive the requested RA. Particularly a first initial Router Advertisement is sent from the routing arrangement to an accessing/requesting end user station substantially immediately upon access/request, i.e. when the router arrangement becomes aware of the fact that the end user station needs a Router Advertisement. This is particularly advantageous and appropriate for point-to-point links, such as e.g. between a GGSN and an MS of a 3GPP, GSM/GPRS, system. It is however also applicable for any other point-to-point links. It may also be implemented for links in e.g. WLANs, even if they are not point-to-point links if e.g. there is communication with one "host" at a time or if same particular identification etc. is included such that the "host" can be distinguished from other "hosts".

Particularly a maximum or a default value is given, indicating the total number of router advertisements or the total time period of the initial phase when a link has been established between the mobile host (station) and e.g. the GGSN. The invention also suggests a method for, in an IP communication system supporting an IPv6 addressing scheme, and comprising a number of end user stations connecting to routing arrangements over links. It comprises the step of; sending router advertisements from a routing arrangement to an end user station, to provide said end user station with information about the first part (prefix) of the IPv6 address, with a controllable and varying frequency during an initial phase, such that the frequency is higher at the beginning and lower at the end of the initial phase. Particularly the method comprises the step of, during the initial phase, gradually increasing, e.g. exponentially, the time interval between consecutive router advertisements, and still further of sending router advertisements in the initial phase at least during a given time interval. In specific implementations the method further comprises the steps of; implementing sending of a message to request IPv6 addressing information, e.g. a router solicitation, from the end user station to the routing arrangement; receiving the message/router solicitation in the routing arrangement; sending only one response router advertisement to the end user station during the initial phase, unless receiving a further router solicitation and even more particularly of sending a router advertisement substantially immediately, without delay, to an end user station needing, e.g. indicated by a router solicitation, IPv6 addressing information.

DETAILED DESCRIPTION OF THE INVENTION

Figure 1:
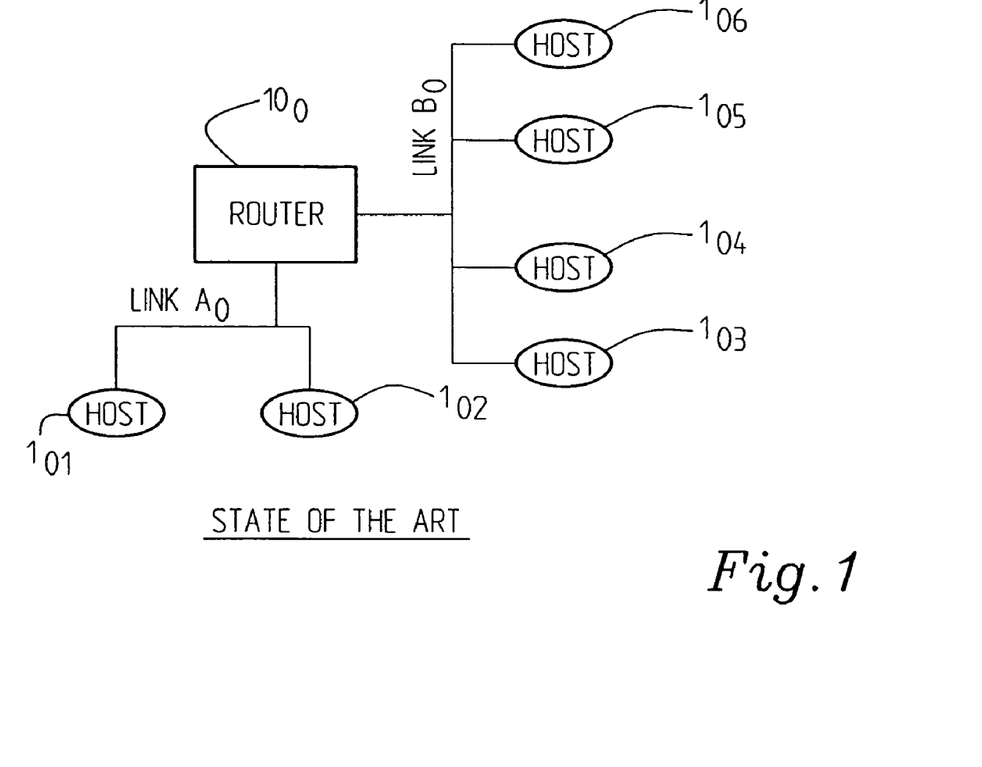
FIG. 1 schematically illustrates a router arrangement connecting to a number of end user stations/hosts e.g. over point-to-multipoint Ethernet Links, FIG. 2 schematically illustrates a routing arrangement connecting to a number of end user stations/hosts over point-to-point links of a system to which the inventive concept can be implemented.

FIG. 1 very schematically illustrates a case in which a router $10_0$ is connected to hosts $1_{01}$, $1_{02}$ over a first link $A_0$ and to hosts $1_{03}$, $1_{04}$, $1_{05}$, $1_{06}$ over a link $B_0$, i.e. point-to-multipoint connections. It may e.g. comprise an Ethernet Link. This is a general implementation e.g. as referred to in IETF RFC 2461.

Figure 2:
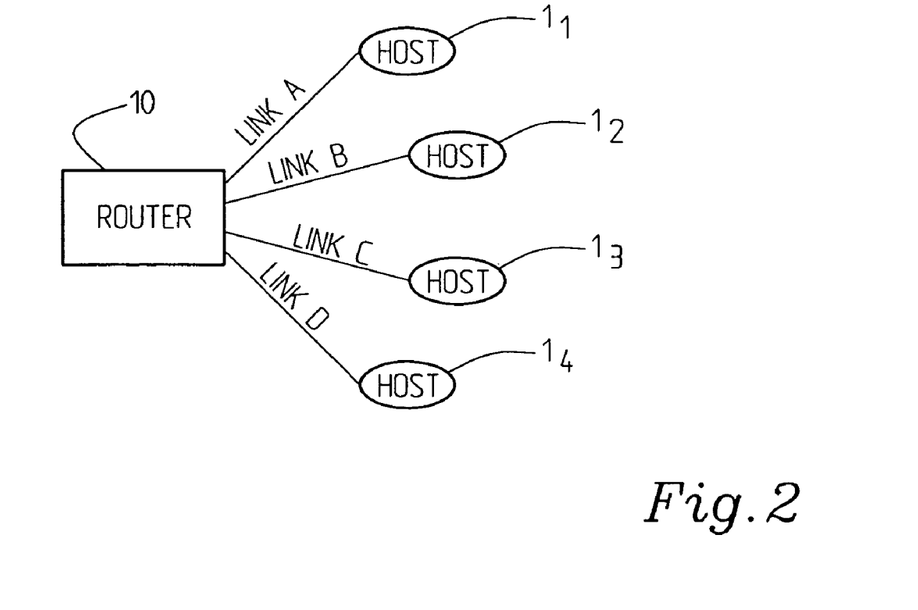

FIG. 2, however, shows a router 10 connected to hosts $1_1$, $1_2$, $1_3$, $1_4$ over separate links A,B,C,D, i.e. there is only one host on each link (point-to-point links).

Such arrangements are of course known, but the technology relates to IPv6 addressing in such implementations, for which improvements can be provided. The hosts may e.g. comprise 3GPP mobile stations. The LPv6 addressing procedure e.g. of RFC 2461 is improved for such arrangements, i.e. both for point-to-multipoint and point-to-point links in general.

The technology will specifically be explained non-limiting, example through implementations concerning GSM/GPRS, although the concept is likewise applicable to any other implementations with routing arrangements communicating with end user stations, specifically over point-to-point links, i.e. when there is just one end user station on each link, but also over point-to-multipoint links.

The access to Internet, Intranet or ISP may involve specific functions such as: user authentication, user's authorization, end to end encryption between end user station (also called MS, host Terminal Equipment, TE and Mobile Terminal, MT) and Intranet/ISP, allocation of a dynamic address belonging to the PLMN/Intranet/ISP addressing space, IPv6 address autoconfiguration etc. For this purpose the Packet Domain may offer either direct transparent access to the Internet or a non transparent access to the Intranet/ISP. In this case the Packet Domain, i.e. the GGSN (Gateway GPRS Support Node), takes part in the functions listed above.

The mechanisms for host configuration and user authentication described here are applicable to the activation of the first context activated for a specific PDP address (using the "PDP Context Activation Procedure"). The activation of any subsequent PDP contexts for that PDP address, using the "Secondary PDP Context Activation Procedure", as well as the use of TFTs (Traffic Flow Templates), is described in 3GPP TS 23.060 also referred to above.

For transparent access the MS (Mobile Station) is given an address belonging to the operator addressing space. The address is given either at subscription in which case it is a static address or at PDP context activation in which case it is a dynamic address. This address is used for packet forwarding between the Internet and the GGSN and within the GGSN. The IPv6 Stateless Address Autoconfiguration, described below, provides a convenient way to assign the MS an IPv6 address. For transparent access the MS need not send any authentication request at PDP context activation and the GGSN does not need to take any part in the user authentication/authorization process. The transparent case provides at least a basic ISP (Internet Service Provider) service. As a consequence of this it may therefore provide a bearer service for a tunnel to a private Internet.

The communication between the PLMN and the Intranet may be performed over any network, even an insecure network e.g. the Internet. There is no specific security protocol between GGSN and the Intranet because security is ensured on an end to end basis between MS and the intranet by the "Intranet protocol", e.g. IP sec, IETF FRC 1825. User authentication and encryption of user data are done within the "Intranet protocol" if either of them is needed. This "Intranet protocol" may also carry private (IP) addresses belonging to the address space of the Intranet.

For IPv6 Non Transparent access to an Intranet or ISP, the IPv6 Address Autoconfiguration offers a major new feature to the TCP/IP architecture (see RFC IETF 2461 and RFC 2462). It simplifies mobile host configuration, network setup and network management. The 3GPP adoption of autoconfiguration is also prepared to allow for future extensions, e.g. to allow site renumbering.

In IPv6, the process of setting up the access to an Intranet or ISP involves two signalling phases. The first signalling phase is done in the control plane, followed by a second signalling phase done in the user plane. The user plane signalling phase can be either stateless or stateful. The stateless procedure, which involves only the MS and GGSN, is described below. The stateful procedure, which involves the MS, GGSN (as DHCP relay agent) and one or several DHCP servers on the Intranet or ISP, is also described later in the document.

Whether to use stateless or stateful address autoconfiguration procedure is configured per APN (Access Point Name) in the GGSN. For APNs configured as stateless, the GGSN must only use the 64 bit Prefix part of the IPv6 address to determine how to forward mobile terminated IP packets. Stateful and stateless autoconfiguration can also co-exist. In that case, the TE (Terminal Equipment) shall use stateless to assign the address and stateful to configure additional parameters. Address autoconfiguration using both stateless and stateful should generally not be used since 3GPP only supports an MS having one prefix, although in other implementations that might be applicable.

Figure 3:
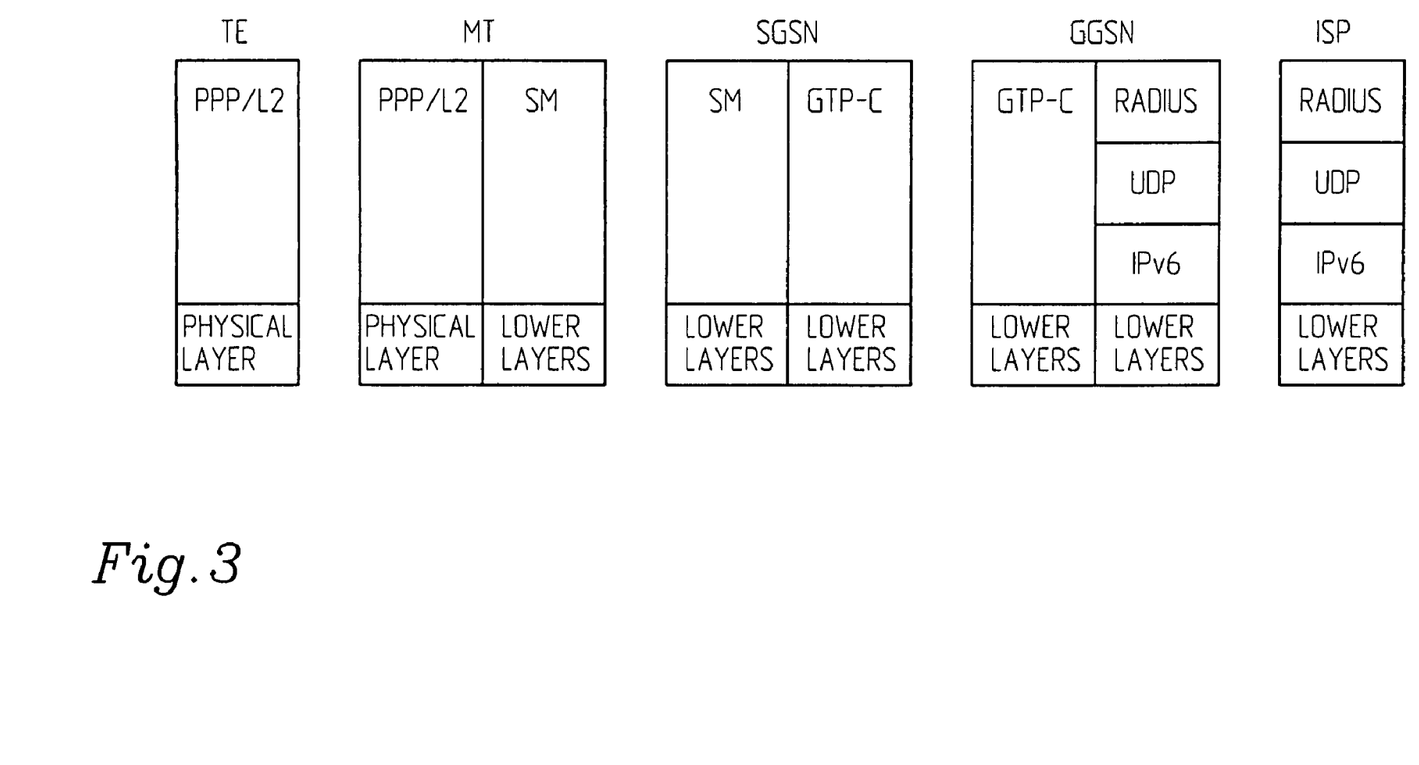
FIG. 3 illustrates the signalling plane of IPv6 non-transparent access to an intranet or an ISP (Internet Service Provider)

For IPv6 PDP Context Activation, the MS is given an IPv6 address belonging to the Intranet/ISP addressing space. A dynamic IPv6 address may be given using either stateless or stateful address autoconfiguration. This IPv6 address is used for packet forwarding within the GGSN and for packet forwarding on the Intranet/ISP. The MS may send an authentication request at PDP context activation and the GGSN can request user authentication from a server, like Radius, AAA, . . . , belonging to the Intranet/ISP. The protocol configuration options are retrieved (if requested by the MS at PDP context activation) from some server (Radius or AAA, . . . ,) belonging to the Intranet/ISP. In order to avoid any conflict between the link-local address of the MS and that of the GGSN, the Interface-Identifier used by the MS to build its link-local address must be assigned by the GGSN. The MT (Mobile Terminal) must then enforce the use of this Interface-Identifier by the TE (Terminal Equipment). This is valid for both stateless and stateful address autoconfiguration. FIG. 3 shows the signalling plane of the IPv6 non transparent case.

Figure 4A:
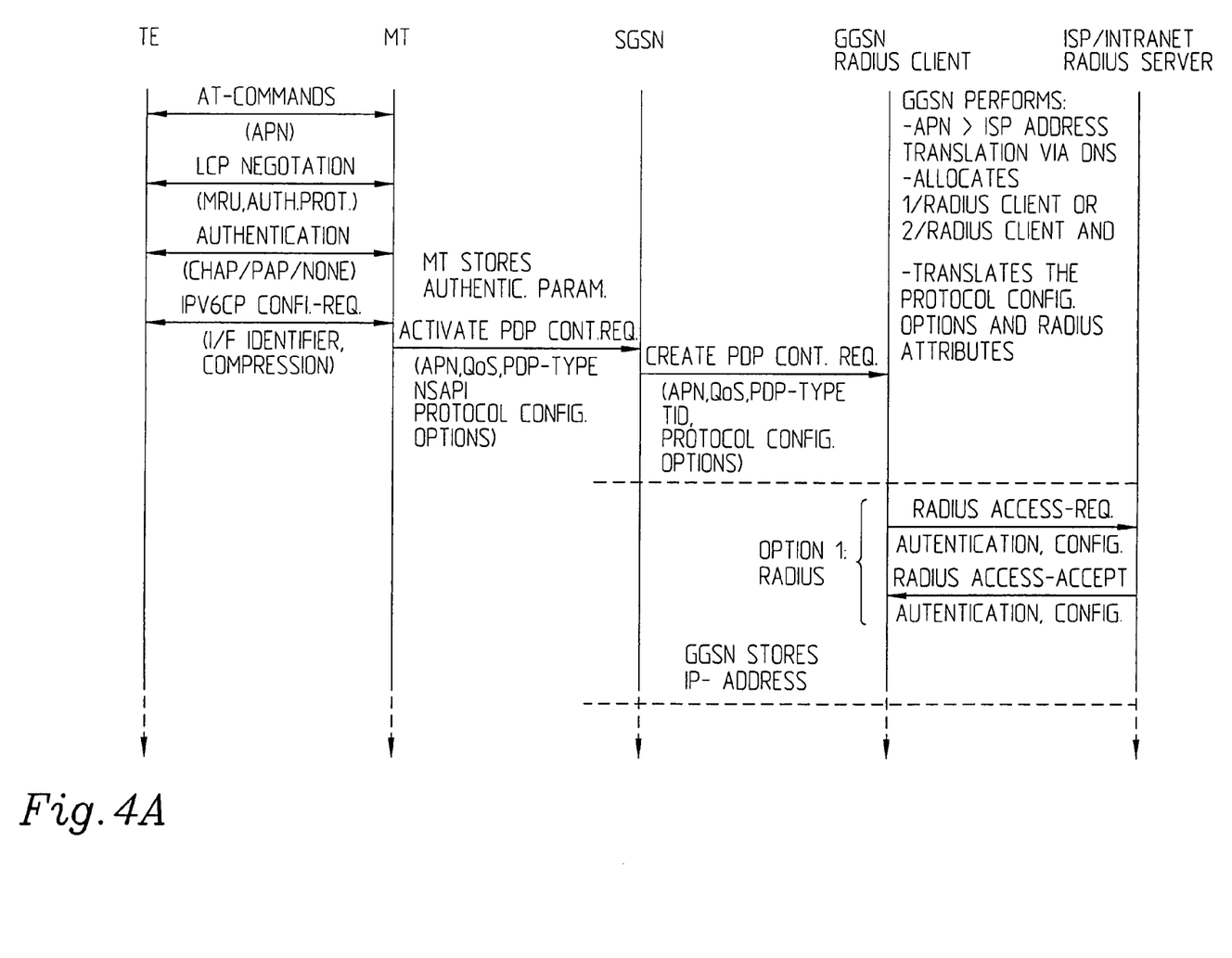
FIGS. 4A, 4B illustrate the PDP context activation for the IPv6 non-transparent case.
Figure 4B:
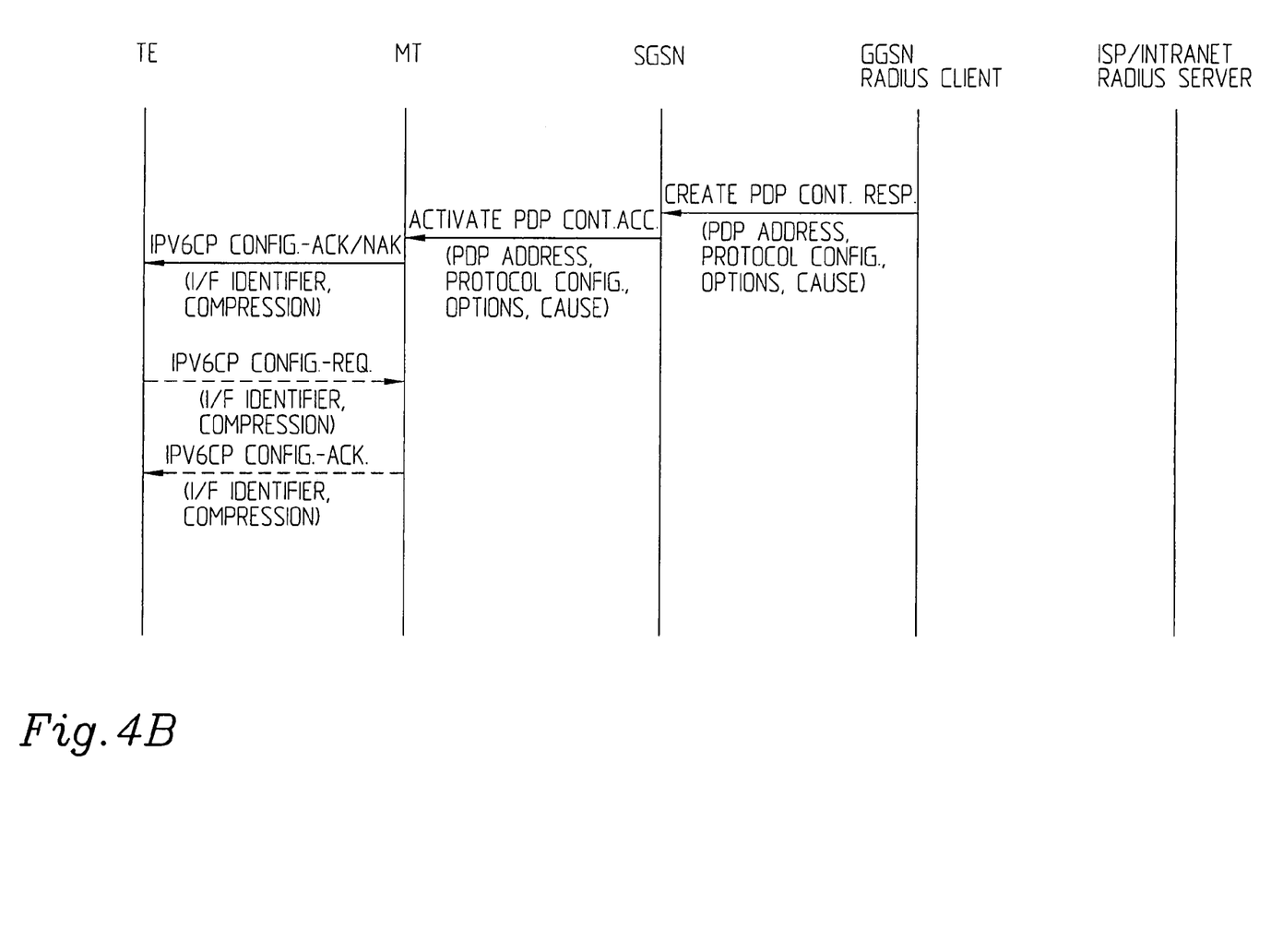

In the signalling flow example of FIGS. 4A, 4B, PPP is used as layer 2 protocol over the R reference point. The MT acts as a PPP server and translates Protocol Configuration Options into SM message IEs. GTP-C (GPRS Tunnelling Protocol) carries this information unchanged to the GGSN which uses the information e.g. for RADIUS authentication. The result of the host authentication is carried via GTP-C back to the SGSN, which relays the information to the MT. The MT finalises the IPv6CP negotiation by sending an IPv6CP Configure-Ack to the TE with the appropriate options included, e.g. Interface-Identifier. The Interface-Identifier shall be used in the TE to create a link-local address to be able to perform IPv6 address autoconfiguration.

In the flow of FIGS. 4A, 4B the TE sends an AT-command to the MT to set up parameters and enter PPP mode. The MT responds with an AT-response. LCP negotiates Maximum-Receive-Unit and authentication protocol. The negotiated authentication protocol is, either CHAP, PAP or "none". The MT shall try to negotiate for CHAP as a first priority. If the negotiated authentication protocol is either of CHAP or PAP, the TE authenticates itself towards the MT by means of that protocol. The MT stores the necessary authentication data and sends a forced positive acknowledgement of the authentication to the TE. The TE requests IPv6 Interface-Identifier negotiation by sending the IPv6CP Configure-Request message to the MT.

The MT sends the Activate PDP context request message to the SGSN, including the Protocol Configuration Options. The Protocol Configuration Options may contain negotiated LCP options such as negotiated Authentication Protocol as well as any authentication data previously stored in the MT. The MS shall for dynamic address allocation leave PDP Address empty and set PDP Type to IPv6. The SGSN sends the Create PDP context request message to the chosen GGSN including the unmodified Protocol Configuration Options. The GGSN deduces from the APN; IPv6 address allocation type (stateless or stateful); the source of IPv6 Prefixes in the stateless case (GGSN internal prefix pool, or external address allocation server); any server(s) to be used for address allocation, authentication and/or protocol configuration options retrieval; the protocol like Radius, to be used with this/those server(s); the communication and security feature needed to have a dialogue with this/those server(s) e.g. tunnel, IPSec security association, dial-up connection (using possibly PPP), etc.

As an example the GGSN may use one of the following options; GGSN internal Prefix pool for IPv6 prefix allocation and no authentication; GGSN internal Prefix pool for IPv6 prefix allocation and RADIUS for authentication. The RADIUS server responds with either an Access-Accept or an Access-Reject to the RADIUS client in the GGSN; RADIUS for authentication and IPv6 prefix allocation. The RADIUS server responds with either an Access-Accept or an Access-Reject to the RADIUS client in the GGSN. IPv6 Prefixes in a GGSN internal Prefix pool shall be configurable and structured per APN or set of APNs within the same addressing scope.

The GGSN shall in the PDP Address IE in the Create PDP Context Response return an IPv6 address composed of a 64-bit Prefix and a 64-bit Interface-Identifier. If stateless address auto-configuration is configured on this APN, the Prefix assigned by the GGSN or the external RADIUS server shall be globally or site-local unique. If stateful address auto-configuration is configured on this APN, the Prefix part of the IPv6 address returned in the PDP Address IE shall be set to the link-local prefix. The GGSN shall analyse the requested values of all the protocol options contained in the received Protocol Configurations Options IE.

The GGSN sends back to the SGSN a Create PDP Context Response message, containing the PDP Address IE and the Protocol Configuration Options IE. The cause value shall be set according to the outcome of the host authentication and configuration. Depending on the cause value received in the Create PDP Context Response, the SGSN either stores the IPv6 Prefix of the PDP Address IE and sends an Active PDP Context Accept to the MS or, sends an Activate PDP Context Reject, to the MS. If Protocol Configuration Options are received from the GGSN, the SGSN shall relay those to the MS.

In case a PDP Context Accept containing a non-zero PDP Address was sent to the MS, the MT extracts the Interface-Identifier from the address received in the PDP Address IE and ignores the Prefix part. If this Interface-Identifier is identical to the tentative Interface-Identifier indicated in the IPv6CP Configure-Request message sent from the TE, the MT sends an IPv6CP Configure Ack packet, indicating this Interface-Identifier, to the TE. If the Interface-Identifier extracted from the address contained in the PDP Address IE is not identical to the tentative Interface-Identifier indicated in the IPv6CP Configure-Request message sent from the TE, the MT sends an IPv6CP Configure Nak packet, indicating the Interface-Identifier extracted from the address contained in the PDP Address IE, to the TE. The TE then sends a new IPv6CP Configure-Request message to the MT, indicating the same Interface-Identifier as was indicated in the received IPv6CP Configure Nak (as indicated by the dotted IPv6CP Configure-Request and Configure-Ack in FIGS. 4A, 4B). Finally the MT responds with a IPv6CP Configure Ack packet.

In case a PDP Context Accept containing a PDP Address equal to zero was sent to the MS, the GGSN shall force the MS to do a Stateful Address Autoconfiguration by setting the M-flag in the RA it will send to the MS. In case a PDP Context Reject was sent to the MS the MT sends an LCP Terminate-Request to the TE.

When the TE has accepted the Interface-Identifier given by the MT, the user plane link from the TE to the GGSN and the external ISP/Intranet are established and the IPv6 address autoconfiguration may proceed. In case a link terminate request packet was sent to the TE, the TE and MT negotiates for link termination. The MT may then send a final AT-response to inform the TE about the rejected PDP Context activation. An LCP Terminate-request causes a PDP context deactivation.

IPv6 Stateless Address Autoconfiguration will now be described with reference to FIG. 5. The first line substantially corresponds to FIGS. 4A, 4B. As described in 3GPP TS 23.060, a PDP Context of PDP type IPv6 is uniquely identified by the prefix part of the IPv6 address only. The MS can select any value for the Interface-Identifier part of the address. The only exception is the Interface-Identifier for the link-local address used by the MS. This Interface-Identifier must be assigned by the GGSN to avoid any conflict between the link-local address of the MS and that of the GGSN itself.

For IPv6 the PDP Context Activation phase is followed by an address autoconfiguration phase. For APNs configured to use Stateless Address Autoconfiguration, the procedure may e.g. be as follows: After the first phase of setting up IPv6 access to an Intranet or to ISP, the TE has been given an IPv6 Interface-Identifier by the GGSN. The TE uses this Interface-Identifier to create an IPv6 Link-Local Unicast Address.

Before the TE can communicate with other hosts or TEs on the Intranet/ISP, the TE must obtain an IPv6 Global/Site-Local Unicast Address. The simplest way is the IPv6 Stateless Address Autoconfiguration procedure described below and in 3GPP TS 23.060. The procedure is substantially consistent with IETF REC 2462. The procedure below takes place through signalling in the user plane. It is done on the link between the TE and the GGSN. From the TE perspective the GGSN is now the first router on the link.

After the GGSN has sent a Create PDP Context Response message to the SGSN, it shall start sending Router Advertisements on the new MS-GGSN link established by the PDP Context. The inclusion of a Prefix information option, with a Prefix and the A-flag set ("Autonomous address configuration flag"), indicates to the MS that stateless address autoconfiguration shall be done. The L-flag shall be set (the prefix can be used for on-link determination). The lifetime of the Prefix shall be set to an infinite lifetime. That is, the Prefix is released at PDP Context deactivation.

When GGSN indicates stateless address autoconfiguration, it must leave the M-flag cleared in the Router Advertisement message. An MS should not do stateless and stateful address autoconfiguration simultaneously, since multiple prefixes are not allowed in the 3GPP domain. The O-flag may be set though, since it does not result in additional addresses. When MS has encountered an indication for stateless address autoconfiguration, it shall ignore the M-flag.

According to the invention the handling of Router Advertisements is to a large extent consistent with what is specified in IETF RFC 2461. Some more specific handling for the MS-GGSN link shall apply though. The GGSN sends Router Advertisements. The Prefix sent in the Router Advertisement shall have a length of 64 bits and it shall be identical to the Prefix returned in the Create PDP Context Response. Its lifetime shall be set to infinity. In practice, the lifetime of a Prefix will be the lifetime of its PDP Context. There shall be exactly one Prefix included in the Router Advertisement.

Figure 5:
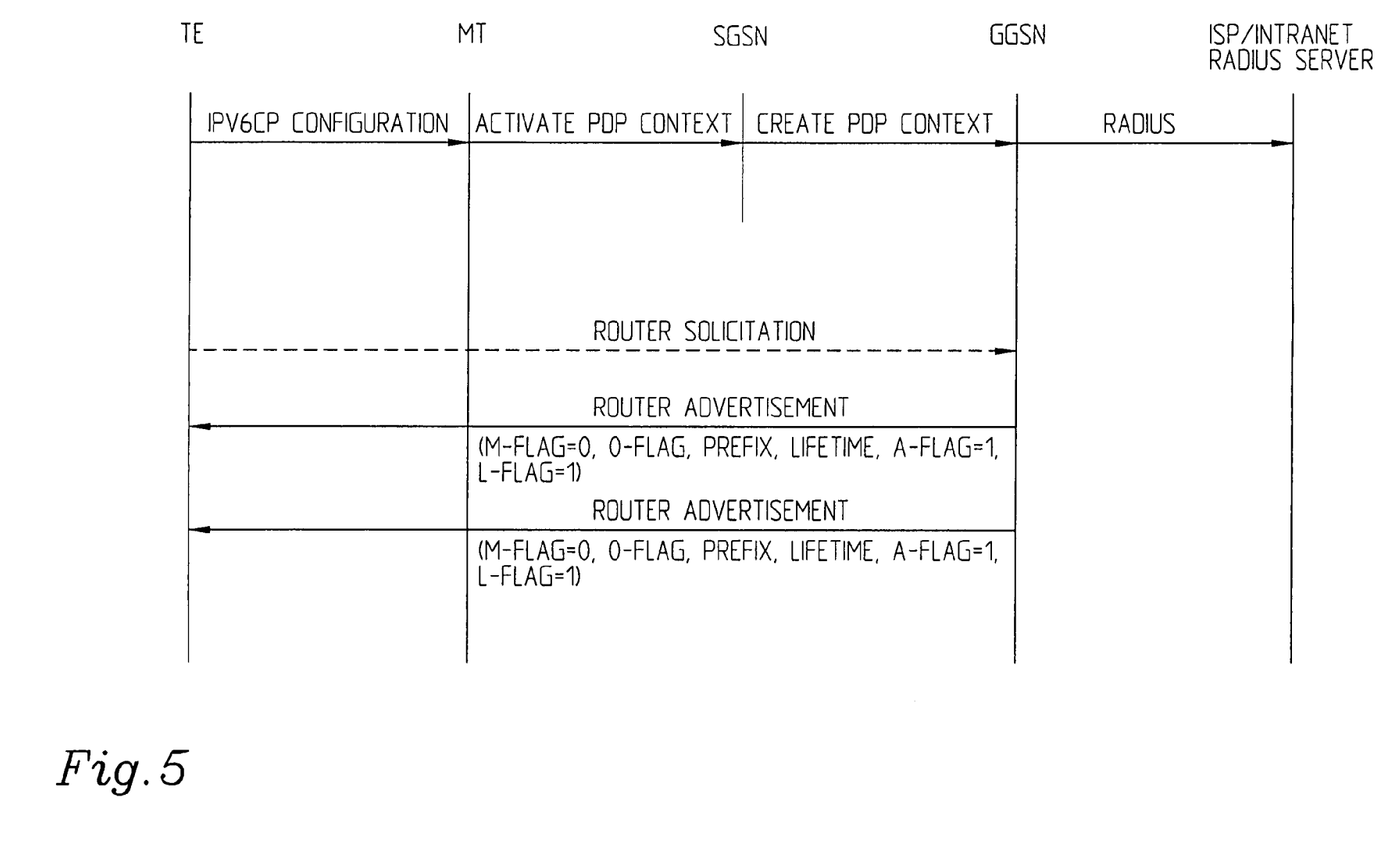
FIG. 5 illustrates IPv6 stateless address autoconfiguration.

The implementation of Router Solicitation may be implemented or not (indicated through a dashed line in FIG. 5). According to the invention RAs during the initial phase are sent with a varying frequency, higher at the beginning, and lower at the end. In one implementation (also applicable to the stateful case described with reference to FIG. 6) the time intervals between subsequent time intervals increase exponentially (or in some other way). One reason therefore is to enable a faster user-plane set-up and to save end user station (host MS/TE/MT depending on implementation) power.

The end user station/TE/MS may issue a Router Solicitation (if implemented) directly after the user plane establishment in one implementation. This will trigger the GGSN to send a Router Advertisement immediately, and thereafter, no further RAs are sent during the initial phase, in particular implementations particularly for point-to-point links or at least "point-to-point inks" as far as addressing is concerned.

Figure 6:
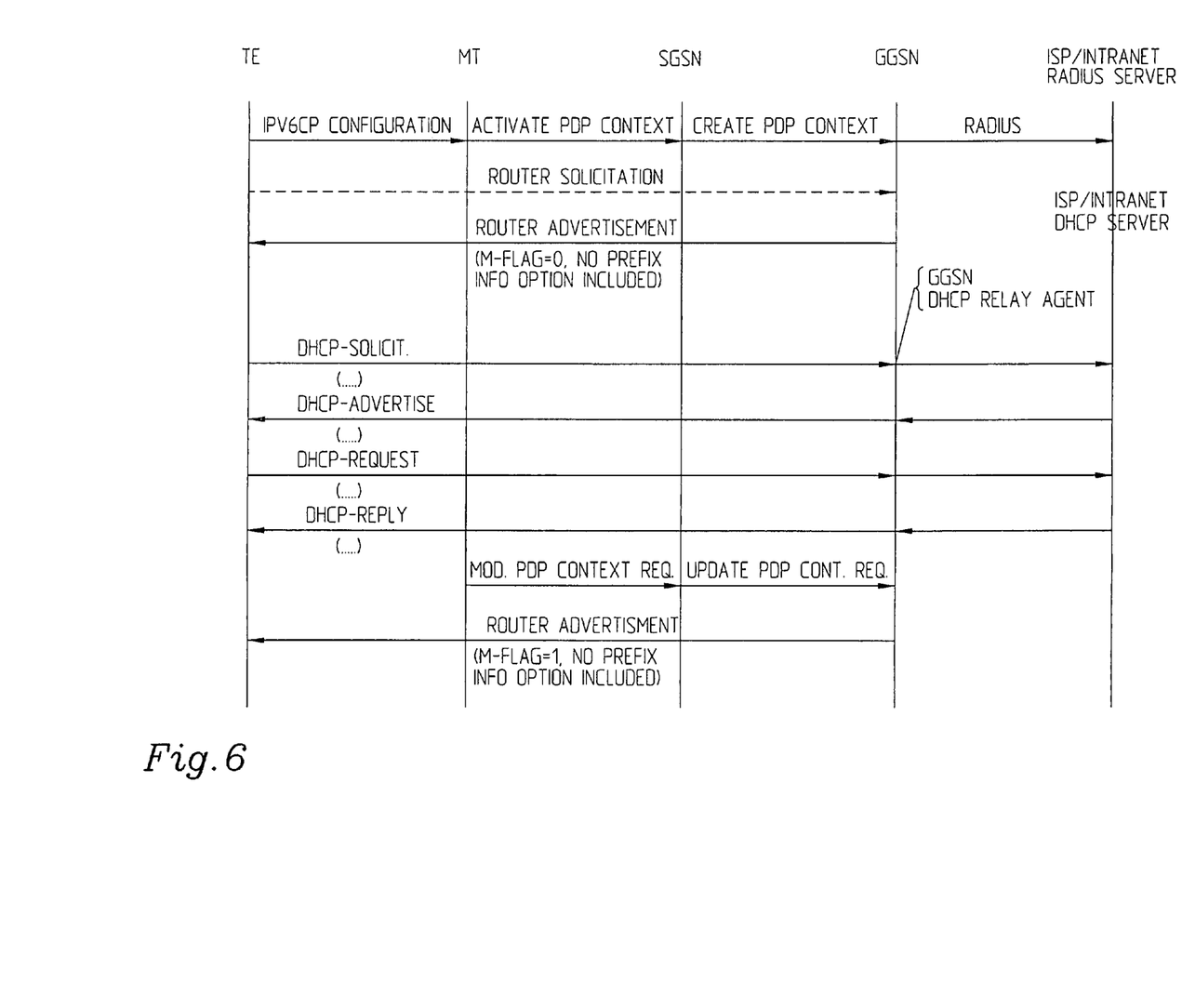
FIG. 6 illustrates IPv6 stateful address autoconfiguration.

FIG. 6 illustrates a signalling flow for IPv6 Stateful Address Autoconfiguration. For IPv6 the PDP Context Activation phase is followed by an address autoconfiguration phase. For APNs configured to use Stateful Address Autoconfiguration, the procedure may e.g. be as disclosed herein. After the first phase of setting up IPv6 access to an Intranet or ISP, the TE has been given an IPv6 Interface-Identifier by the GGSN. The TE uses this Interface-Identifier to create an IPv6 Link-Local Unicast Address. After the GGSN has sent a Create PDP Context Response message to the SGSN, it shall start sending Router Advertisements on the new MS-GGSN link established by the PDP Context. This shall be consistent with what is specified in RFC 2461 with the difference that the frequency with which initial RAs (on the link between MS (end user station or host) and GGSN) are sent is variable, higher at the beginning, and lower at the end of the initial phase.

(After the initial phase the GGSN sends Router Advertisements periodically). When the APN is configured to use Stateful Address Autoconfiguration, the Router Advertisements shall not contain any Prefix-Information option and the M-flag ("Managed Address Configuration Flag") shall be set. The TE/end user station/MS may issue a Router Solicitation directly after the user plane establishment. Router Solicitations are however not necessarily implemented. If implemented, however, this may trigger the GGSN to send a Router Advertisement immediately, according to one implementation. Thereafter no more RAs are sent in the initial phase. When the TE has received a Router Advertisement with the M-flag set, it shall start a DHCPv6 configuration including a request for an IPv6 address. In succeeding Router Advertisements sent by GGSN on the MS-GGSN link, the Prefix information option should still be excluded, even though GGSN- has learned the Prefix of the MS through the DHCP relay agent. The Prefix need not to be advertised since all addresses are off link, and no stateless address autoconfiguration needs to be signalled in this case (see RFC 2461).

For IPv6 Stateless and Stateful Address Autoconfiguration to work properly the GGSN must act as a router towards the MS. In this respect the GGSN shall be generally consistent with the RFCs specifying this process (for example RFC 2462 and RFC 2461). RFC 2461 specifies a set of conceptual router configuration variables. Some of these necessitate a specific interpretation for the MS-GGSN link and are defined per APN.

MaxRtrAdvInterval
  Shall have a default value of 21600 seconds (6 h)

MinRtrAdvInterval
  Shall have a default value of 0.75* MaxRtrAdvInterval i.e. 16200 seconds (4.5 h).

AdvValidLifetime
  Shall have a value giving Prefixes infinite lifetime, i.e. 0xFFFFFFFF. The assigned prefix remains Preferred until PDP Context Deactivaton.

AdvPreferredLifetime
  Shall have a value giving Prefixes infinite lifetime, i.e. 0xFFFFFFFF. The assigned prefix remains Preferred until PDP Context Deactivation.

RFC 2461 also specifies a number of protocol constants. According to the present invention, however, some of them shall have specific values. These are:

MAX_INITIAL_RTR_ADVERT_INTERVAL
  This constant may be variable e.g. within the 3GPP domain. It can have a value that gradually increases (exponentially or by some other means) with the number of initial Router Advertisements sent. For example, the GGSN can send initial Router Advertisements after 1,2, 4,8,16 and 32 seconds. This will enable a fast set-up of the MS-GGSN link in most cases, while still allowing the TE to receive a Router Advertisement within the initial phase, even in case of bad radio conditions or slow response time, without having to send a large number of initial Router Advertisements.

MAX_INITIAL_RTR_ADVERTISEMENTS
  This is the number of Router Advertisements sent during the initial phase after the MS-GGSN link has been established. Shall, in a specific implementation, have a default value so that initial Router Advertisements are sent for at least 30 seconds. The actual value depends on the implementation of MAX_INITIAL_RTR_AD-VERT_INTERVAL.

After the initial phase, the periodicity is controlled by the MaxRtrAdvInterval and the MinRtrAdvInterval constants.

The inventive concept and some specific implementations will now be more thoroughly explained with reference to FIGS. 7,8 and 9.

By end user station should be understood any host, mobile station, Terminal Equipment and/or Mobile Terminal. If for example a Laptop is connected to a MS, the Laptop acts as TE (IP-host) and the mobile station as an MT.

Figure 7:
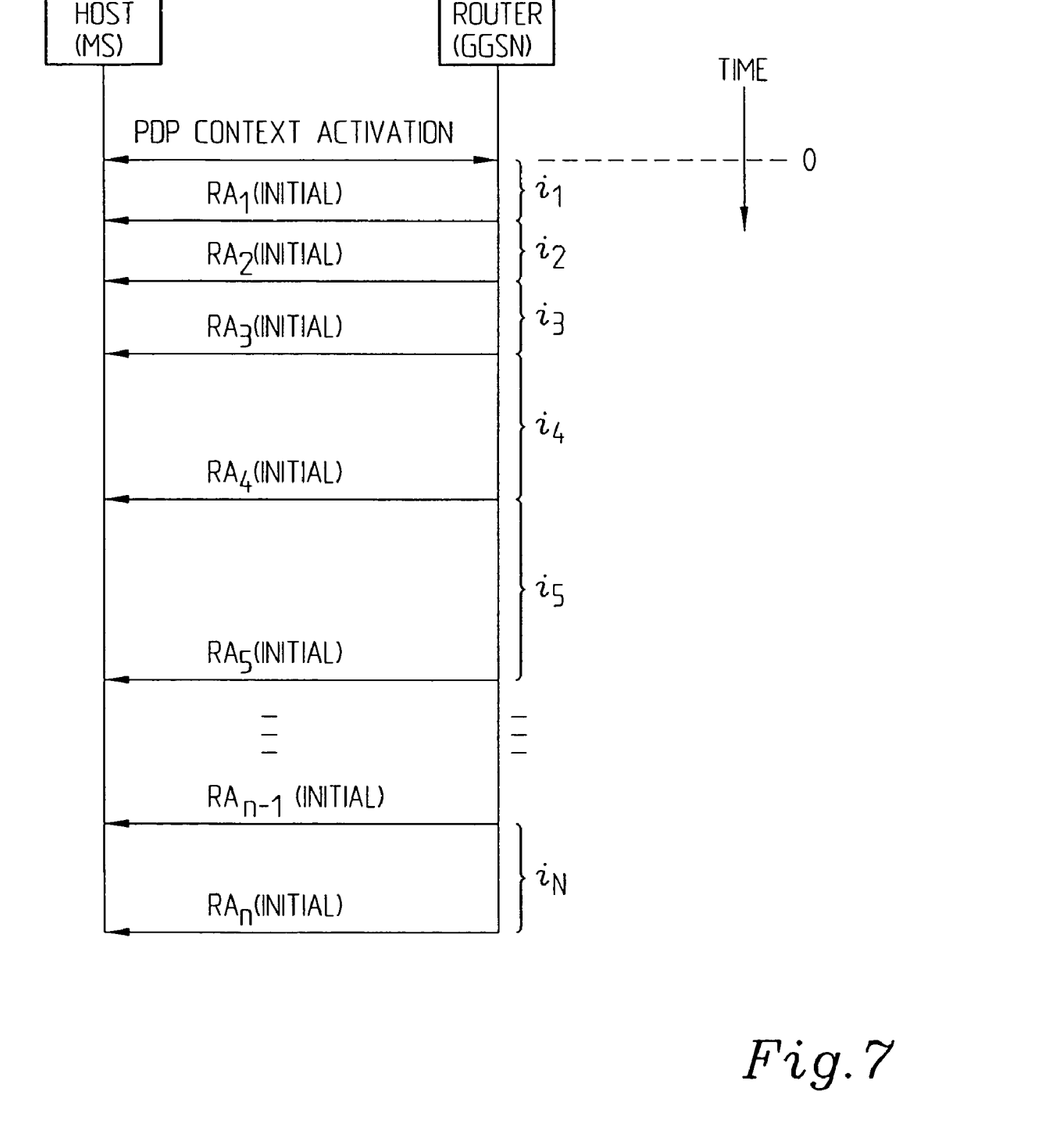
FIG. 7 illustrates, initial phase sending of RAs according to the invention for router and prefix detection in the 3GPP-domain.

FIG. 7 illustrates the signalling flow for router and prefix discovery in the 3GPP-domain during the initial phase of sending Router Advertisements, RAs from a a router here a GGSN and a host (end user station), e.g. a 3GPP mobile station (MS).

$RA_1$, $RA_2$ denote initial RAs e.g. according to IETF RFC 2461 as referred to above, $i_x$ for x=1, . . . ,n illustrate the time interval between consecutive RAs (or rather the time interval that should lapse from PDP Context activation till the first RA ($RA_1$) and subsequently the time intervals between consecutive RAs). According to IETF RFC 2461 $i_x$ should be a fixed value given by the router constant MAX_INITIAL_AD-VERT_INTERVAL. This means that all $i_x$:s (for x=1, . . . ,n) are similar (with the exception for a small randomized component or fraction). According to the invention, on the contrary, each time interval $i_x$ can be selected freely and independently of the other time intervals. In advantageous implementations an appropriate algorithm or function can be used to control the $i_x$ values. In a particularly advantageous implementation an exponential increase is implemented. In a most advantageous implementation each $i_x$ should be configurable, in the routing arrangement, particularly in GGSN.

Figure 8:
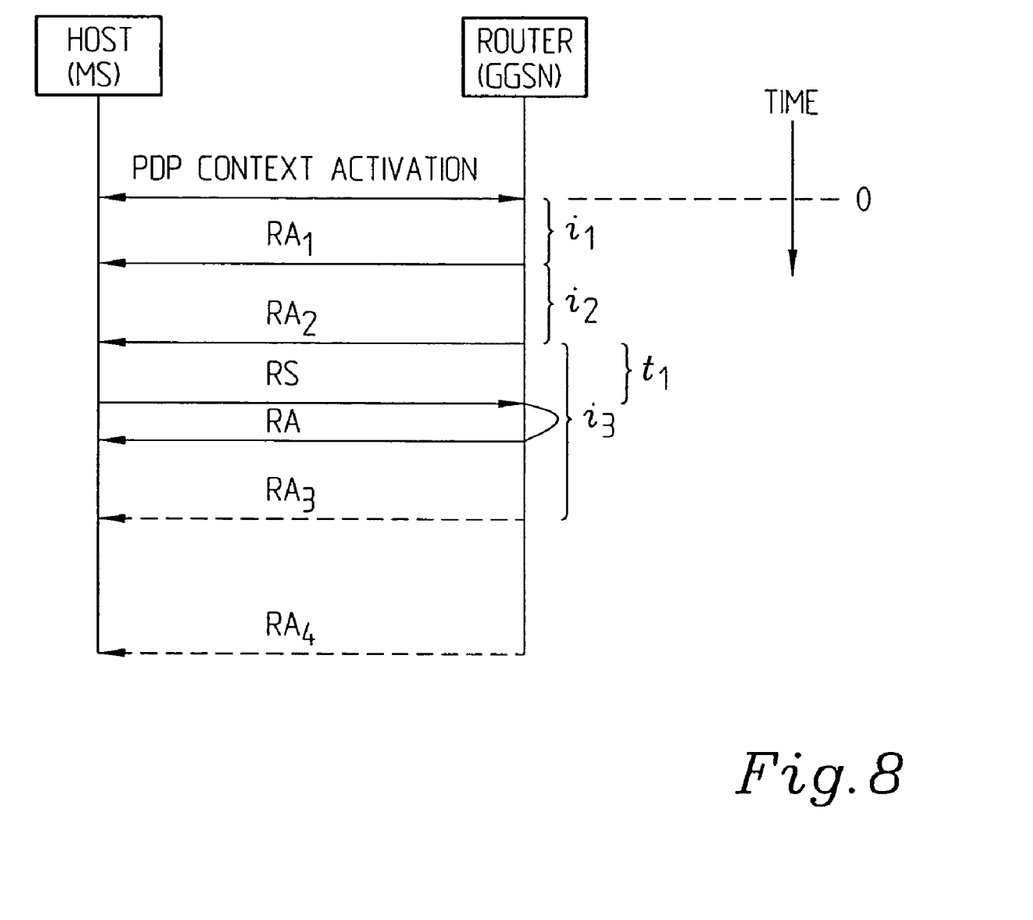
FIG. 8 illustrates an implementation of the inventive concept wherein only one initial RAs is sent after reception of an Router Solicitation RS.
Figure 9:
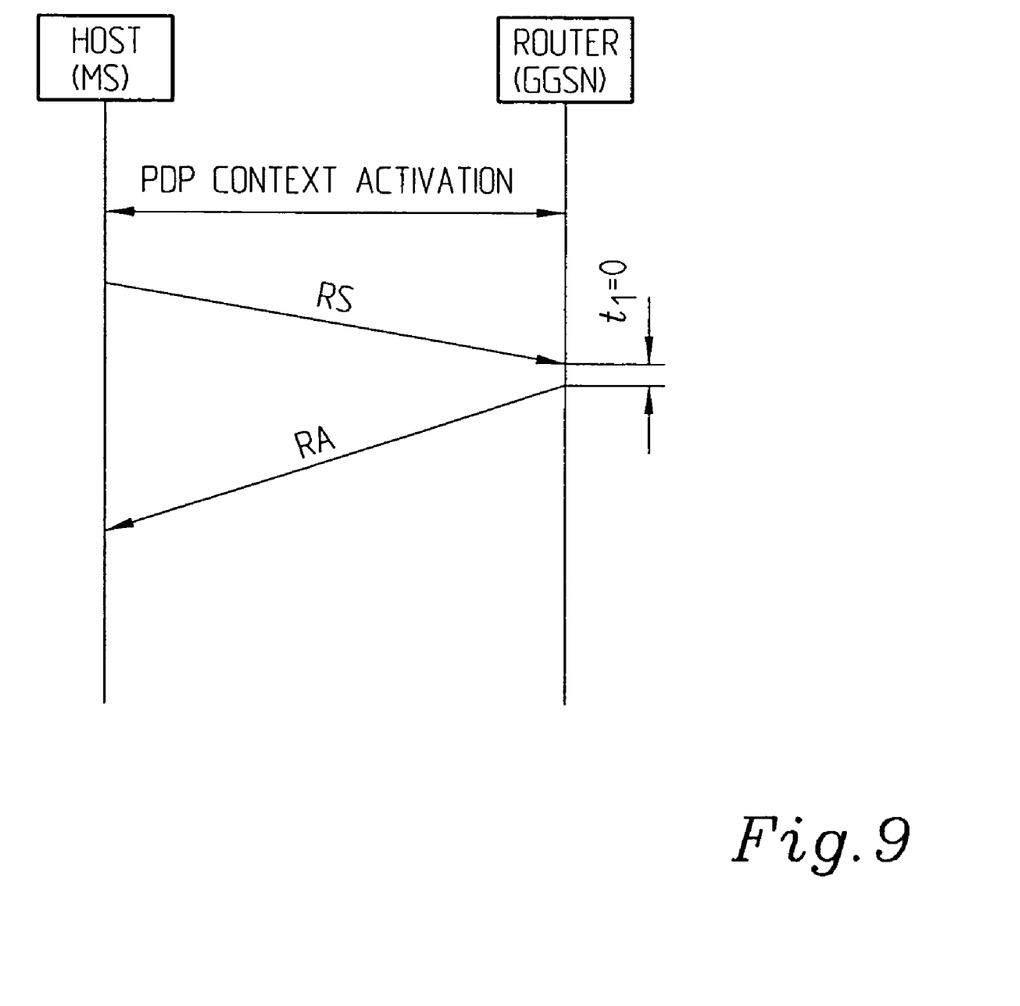
FIG. 9 illustrates an implementation according to the invention wherein no randomisation is used when sending an RA in response to an RS.

FIG. 8 shows a particular implementation according to which initial RAs can be aborted. If sending of Router Solicitations (RS) is implemented, if an RS arrives during the initial phase of sending RAs, a response RA is simply returned (e.g. according to 6.2.6. in RFC 2461). According to the invention no further initial RAs are sent after that.

In FIG. 8 it is supposed that the router (GGSN) receives an RS after having sent $RA_2$. After receiving the RS, an RA (response RA) is sent (before the relevant time interval has lapsed) and $RA_3$, $RA_4$ are not sent (indicated through dashed lines). Only the "response RA" is sent, and subsequent (non-initial) periodic RAs, or "unsolicited" RAs according to 6.2.4. in RFC 2461. In one particular case an RS may be received before any initial RAs at all have been sent. Then will only the response RA, i.e. the RA that is a response to the RS, be sent.

Another particular implementation relates to omission of the random component at sending an RA in response to an RS on the point-to-point link between end user station (host/MS) and routing arrangement (GGSN). This is illustrated in FIG. 9. According to the present invention $t_1$ is always set to be 0, as opposed to e.g. RFC 2461, section 6.2.6. according to which $t_1$ must be a random time between 0 and MAX_RA_DELAY/_TIME seconds, default 0,5 s. This is particularly advantageous since it further speeds up set-up and it can be done since it relates to point-to-point links. However, also for non point-to-point links, e.g. in WLANs this could be implemented if communication with one host at a time is implemented, or if specific address configuration is implemented, e.g. if the links are point-to-point links from an "address point of view".

Thus, according to an advantageous implementation of the invention, RAs are be sent frequently in the beginning and less and less frequently up to some time has passed e.g. during the initial phase (cf. sending of RAs). The values of the time intervals between successful PDP Context and first initial RA and between consecutive initial RAs may be hard coded or configurable.

An optimisation as referred to above, may also be done if the mobile terminal is implemented to send a Router Solicitation (RS). Mobile terminals however also be designed NOT to send RSs, to save battery power or possibly time. If however a terminal uses an RS to request an RA from the GGSN, an optimisation of the RA algorithm becomes possible. The terminal sends the requested RA but further initial RAs are avoided. Particularly if the mobile terminal (MS) is the only host connected the MS-GGSN link, RAs need not to be sent any more. Just the periodic RAs can be sent (the next RA e.g. 6 hours) later. If the RA sent from GGSN to MS is lost for some reason, the MS will repeat its request (RS) having a response RA as a consequence.

To summarize this implementation, if an MS sends an RS when it gets a successful reply to the Create PDP Context Request, the GGSN sends one RA and thereafter stops sending any more initial RAs.

A further particular implementation relates to exclusion of the randomisation part when calculating when to send RAs, e.g. in response to an RS. This is particularly applicable when there is only one host on the link.

The motivations for not implementing the random part when transmission times for RAs is to enable a faster user-plane set-up and less MS power consumption during long continued operation. The 3GPP MS-GGSN link though (as any point-to-point link) is a special case with only one host on the link—the MS. Therefore it is possible to send the RA immediately when the RS is received. This will also give the end-user better response times. However, in some cases it is possible to skip the random parts also when there are more hosts on the link, as discussed earlier.

It is an advantage of the invention that processing power can be saved and that radio resources can be saved (in mobile environments). It is also an advantage that just response times are given i.e. enabling a fast set-up.

The invention is of course not limited to the specifically illustrated embodiments. It is implementable for Internet in general, e.g. within the 3GPP domain (WCDMA, GSM, GPRS) fixed and wireless IP-networks in general, as well as for WLANs. Particularly it is applicable for the 3GPP IP Multimedia Subsystem (IMS) domain, which is a specific domain within 3GPP where many interactive multimedia services are specified and standardized.

The invention claimed is:

1. A communication system that supports an IPv6 (Internet Protocol version 6) addressing scheme, comprising:
    a number of end user stations (hosts) connected over access networks, and
    routers connected to end user stations over links and configured to send router advertisements to end user stations to support provisioning of IPv6 addresses for the end user stations,
    wherein at least one of the routers is configured to:
        send initial router advertisements to an end user station with a controllable and varying frequency during an initial phase, wherein a value is provided indicating a total number of initial router advertisements for the initial phase or a total time period of the initial phase when a link has been established between the mobile host and the router,
        set varying time intervals to lapse between consecutive initial router advertisements so that during the initial phase, the frequency of sending the initial router advertisements is higher at the beginning of the initial phase and lower at the end of the initial phase, and
        send router advertisements to the end user station with a fixed periodicity when the initial phase has lapsed corresponding to when the total number of initial router advertisements has been sent or when the total time period of the initial phase has expired.

2. The communication system according to claim 1, wherein the one router is configured to gradually decrease the frequency with which initial router advertisements are sent so that a length of the time intervals between consecutive initial router advertisements gradually increases.

3. The communication system according to claim 1, wherein the one router is configured to send initial router advertisements during the initial phase with a varying, decreasing frequency, at least during a given time period, and wherein the router is configured to set the time intervals separately.

4. The communication system according to claim 1, wherein the decrease in frequency for sending of initial router advertisements occurs at a predetermined transmission time of an initial router advertisement, and wherein the decrease in frequency varies.

5. The communication system according to claim 1, wherein the one router is configured to send initial router advertisements during the initial phase with consecutive time intervals ($\Delta T_i$) varying as ($\Delta T_{i,i=1,\ldots}$) 1 s, 2 s, 4 s, 8 s, 16 s, 32 s, starting with the time interval for sending a first initial router advertisement after establishment of connection.

6. The communication system according to claim 1, wherein the length of the time intervals between router advertisements increases exponentially.

7. The communication system according to claim 1, wherein the one router is configured to send initial router advertisements for at least 30 seconds.

8. The communication system according to claim 1, wherein the time periods to lapse before sending a first initial router advertisement and subsequently between consecutive initial router advertisements are hard coded in the router.

9. The communication system according to claim 1, wherein the time periods to lapse before a first initial router advertisement and between consecutive initial router advertisements are configurable in the router.

10. The communication system according to claim 1, wherein after the initial phase has lapsed, the one router is configured to send unsolicited router advertisements with a fixed periodicity.

11. The communication system according to claim 1, wherein the links between a one router and end user stations are point-to-multipoint links.

12. The communication system according to claim 1, wherein the links between the one router and end user stations are point-to-point links.

13. The communication system according to claim 1, wherein the end user station is configured to send a message comprising a router solicitation (RS) to request information needed for creation of an IPv6 address to the one router, wherein further the one router is configured to handle reception of router solicitations, and to, upon reception of such a message, only send one further initial router advertisement comprising a response-solicited, initial router advertisement during the initial phase, unless a further router solicitation is received, and to interrupt sending of further initial router advertisements.

14. The communication system according to claim 1 configured to implement IPv6 address autoconfiguration.

15. The communication system according to claim 1, further comprising an IP network including fixed and/or wireless end user stations.

16. The communication system according to claim 1, further comprising a 3GPP system.

17. The communication system according to claim 1, further comprising a Wireless Local Area Network (WLAN).

18. The communication system according to claim 17, wherein the routers comprise GGSNs and at least some end user stations are mobile hosts, wherein a prefix of the IPv6 address is included in the Router Advertisement (RA), and wherein upon reception of the RA, the mobile host is configured to generate an IPv6 suffix.

19. A router in an IP communication system supporting an IPv6 addressing scheme and connectable to a number of end user stations over links, wherein the router is configured to:
   send router advertisements to provide an end user station with information about a first part of an IPv6 address for the end user station,
   send initial router advertisements to the end user station with a controllable and varying frequency during an initial phase, wherein a value is provided indicating a total number of initial router advertisements for the initial phase or a total time period of the initial phase when a link has been established between the mobile host and the router,
   set varying time intervals between initial router advertisements to the end user station to lapse between consecutive initial router advertisements, wherein during said initial phase, the sending frequency is higher at the beginning of the initial phase and lower at the end of the initial phase, and
   send router advertisements with a fixed periodicity to the end user station when the initial phase has lapsed corresponding to when the total number of initial router advertisements has been sent or when the total time period of the initial phase has expired.

20. The router according to claim 19, further configured to send initial router advertisements with a frequency which gradually decreases so that the length of the time intervals before sending a first initial router advertisement and between consecutive initial router advertisements gradually increases.

21. The router according to claim 19, further configured to send initial router advertisements during the initial phase with a varying, decreasing frequency at least during a given time period.

22. The router according to claim 21, wherein the lengths of the time intervals before a first initial router advertisement and between further initial router advertisements increase exponentially.

23. The router according to claim 19, wherein the time periods to lapse before sending a first initial router advertisement and subsequently between consecutive initial router advertisements are hard coded in the router.

24. The router according to claim 19, further configured to receive a message comprising a router solicitation (RS) requesting information needed for creation of an IPv6 address from an end user station, and to, upon reception of such a message, only send one further, initial router advertisement comprising a response-solicited, initial router advertisement during the initial phase, unless a further router solicitation is received and to interrupt sending of further initial router advertisements.

25. The router according to claim 19, wherein the link between the router and an accessing/requesting end user station is a point-to-point link and wherein the router is adapted to send a first initial router advertisement to the accessing/requesting end user station substantially immediately upon access/request.

26. The router according to claim 19, wherein the router is a GGSN of a 3GPP or GSM/GPRS system.

27. A method implemented in a router in an IP communication system supporting an IPv6 addressing scheme and comprising a number of end user stations connectable to routers over links, comprising:
   automatically configuring time intervals between consecutive initial router advertisements during an initial phase, wherein a value is provided indicating a total number of initial router advertisements for the initial phase or a total time period of the initial phase when a link has been established between the mobile host and the router,
   sending initial router advertisements from the router to an end user station to provide the end user station with information about a first part of the IPv6 address with a controllable and varying frequency during the initial phase, the frequency being higher at the beginning of the initial phase and lower at the end of the initial phase, and
   sending router advertisements with a fixed periodicity when the initial phase has lapsed corresponding to when the total number of initial router advertisements has been sent or when the total time period of the initial phase has expired.

28. The method according to claim 27, further comprising:
   during the initial phase, gradually increasing the time interval between consecutive initial router advertisements.

29. The method according to claim 27, further comprising:
   sending initial router advertisements in the initial phase at least during a given time interval.

30. The method according to claim 27, wherein the link between end user station and router comprises as a point-to-point link and wherein the method further comprises the steps of:
   implementing sending of a message comprising a router solicitation to request IPv6 addressing information from the end user station to the router,
   at reception of a router solicitation in the router,
   sending only one response, solicited, initial router advertisement to the end user station during the initial phase, thus interrupting sending of further initial router advertisements unless receiving a further router solicitation.

31. The method according to claim 27, further comprising:
   sending an initial router advertisement substantially immediately to an end user station needing IPv6 addressing information.

* * * * *

UNITED STATES PATENT AND TRADEMARK OFFICE
CERTIFICATE OF CORRECTION

PATENT NO. : 7,457,253 B2
APPLICATION NO. : 10/947550
DATED : November 25, 2008
INVENTOR(S) : Ronneke It is certified that error appears in the above-identified patent and that said Letters Patent is hereby corrected as shown below:

In Column 2, Line 51, after "wait" delete "for".

In Column 3, Line 31, delete "sill" and insert -- still --, therefor.

In Column 6, Line 29, delete "LPv6" and insert -- IPv6 --, therefor.

Signed and Sealed this

Twenty-fourth Day of November, 2009

David J. Kappos
*Director of the United States Patent and Trademark Office*